March 6, 1951  H. HEIMANN ET AL  2,544,631
RETAINING RING ASSEMBLY
Filed Dec. 11, 1946  2 Sheets-Sheet 1

Inventors
HEINRICH HEIMANN,
LAWRENCE BROZEK,
Attorney

March 6, 1951 H. HEIMANN ET AL 2,544,631
RETAINING RING ASSEMBLY
Filed Dec. 11, 1946 2 Sheets-Sheet 2

Inventors
HEINRICH HEIMANN,
LAWRENCE BROZEK,
Attorney

Patented Mar. 6, 1951

2,544,631

UNITED STATES PATENT OFFICE 2,544,631

RETAINING RING ASSEMBLY

Heinrich Heimann, New York, and Lawrence Brozek, Jackson Heights, N. Y., assignors to Waldes Koh-I-Noor, Inc., Long Island City, N. Y., a corporation of New York Application December 11, 1946, Serial No. 715,570

3 Claims. (Cl. 85—8.5)

This invention relates to improvements in retaining ring assemblies of the type wherein a retaining ring serves as an artificial shoulder for securing machine parts, for example, gears, bearing races, pulleys and the like, against axial displacement of a shaft or in the bore of a housing, to an improved retaining ring for use therewith, and to a simplified and inexpensive method of manufacturing such retaining rings.

A widely used retaining ring functioning as aforesaid takes the form of an open-ended spring ring which is adapted to be sprung into its groove in a shaft or housing bore and to seat itself with spring pressure against the groove bottom. Preferably, such rings are of open-ended and tapered construction according to which their section heights decrease progressively from the ring mid-section to the free ends thereof, the taper being calculated so that the ring maintains circularity under deformation, i. e. when spread in the case of the external ring and contracted in the case of the internal ring; such tapering of the ring insuring that when the ring is stressed in seating it will fit tightly against the bottom of the groove throughout its full arcuate length. Moreover, as usually constructed, such rings are preferably provided at their open ends with apertured ears to facilitate their assembly and disassembly in and from their grooves by the use of a plier-like tool.

In the assemblies employing such rings, difficulties have been encountered because of the inability of the ring to exactly locate the machine part relative to shaft or housing, this being due to the fact that there are necessarily tolerances in the length of the machine part to be held, in the location of the groove, and in the thickness of the ring itself. The combined total of said tolerances may result in some end play between the holding face of the ring and the abutting surface of the machine part to be held thereby, which may cause vibration and other disturbances in the assembly. To overcome this disadvantage, it has been previously suggested to form the ring with an inclined or beveled surface along and concentric with the groove edge of the ring, i. e. the inner edge of the external and the outer edge of the internal ring, and to incline one side wall of the groove so that it forms the surface of a truncated cone which is complementary to the inclined or beveled surface of the ring. Depending on the amount of end play existing in the assembly, as results from the aforementioned tolerances, the ring will seat more or less deeply in its groove, with a tendency to return to its unstressed state. Accordingly, such a ring acts as a radial wedge having a component of axial thrust causing its holding face to abut tightly against the machine part to be located; and through proper dimensioning of parts exact location of machine part can be achieved.

However, it has been found that a ring provided with an inclined or beveled surface adjacent its groove edge is open to the objection that it is weakened, consequent to the removal as by grinding of some material from its cross section, to the same extent that any section is weakened by a chamfer. In the case of a retaining ring, there exists the danger that such weakening may result in the ring being warped and distorted when compressed. As distinguished therefrom, a retaining ring which is beveled as by bending an annular zone of the ring along its groove edge out of the plane of the ring body loses none of its section (axial) thickness and hence is not so weakened but in fact is reinforced by such bending.

A principal object of the invention, therefore, is to provide a beveled ring capable of taking up end play in the assembly in which it is employed, and which is characterized by equal axial thickness throughout its full section height (radial width) and, therefore, by equal strength throughout its full radial width.

Another disadvantage of the prior retaining ring having a beveled face is that its manufacture can be attained only in a two-step operation. Such a ring was either stamped out of a strip of spring metal and the beveled surface supplied by a grinding operation, or the beveled surface was imparted in a coining operation followed by a cutting or blanking out operation. Another object of the invention, therefore, is to provide a method of manufacturing beveled rings in a single or one-step operation.

Moreover, the invention contemplates and aims to provide a retaining ring, preferably of tapered construction, which is characterized by an annular zone adjoining its groove edge throughout the full arcuate length thereof that is inclined to the plane of the ring body by an acute angle. While having the same advantages in use as the prior beveled ring, the beveled ring as herein provided will in addition be of uniform strength throughout its full arcuate length, thus to overcome the disadvantages of the prior beveled ring, namely, its liability to warping and distortion when compressed (internal ring) or expanded (external ring).

The above and other objects and features of advantage of the invention will be apparent from the following description and accompanying drawings, wherein—

Figure 1:
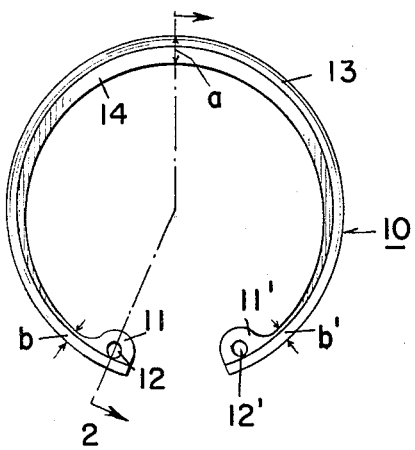
Fig. 1 is a plan view of an internal retaining ring according to the invention.
Figure 2:
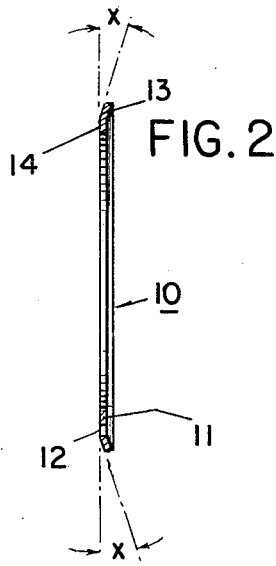
Fig. 2 is a section taken along line 2—2 of Fig. 1.
Figure 3:
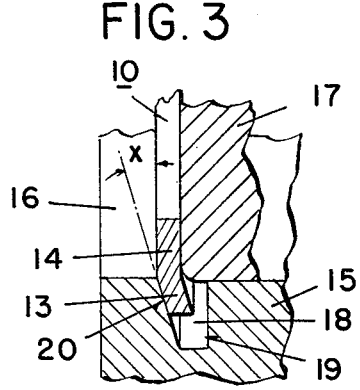
Fig. 3 is a partial section taken through a typical retaining ring assembly employing a retaining ring as shown in Figs. 1 and 2, in which the ring is shown partially seated to illustrate its wedging action.
Figure 4:
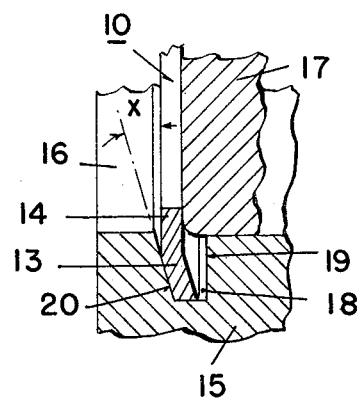
Fig. 4 is a view similar to Fig. 3 wherein the retaining ring is shown in full seated position.
Figure 5:
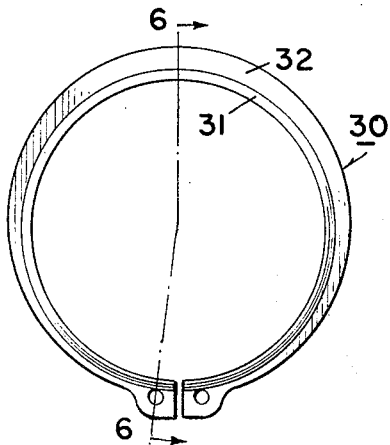
Fig. 5 is a plan view of an external retaining ring according to the invention.
Figure 6:
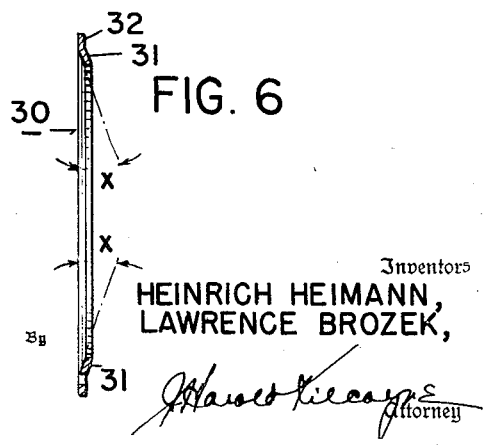
Fig. 6 is a section taken along line 6—6 of Fig. 5.
Figure 7:
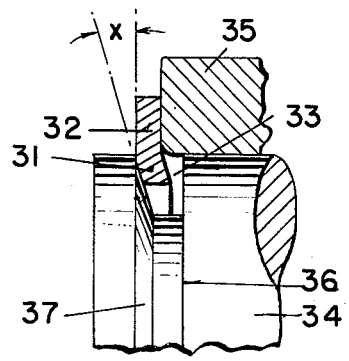
Figure 8:
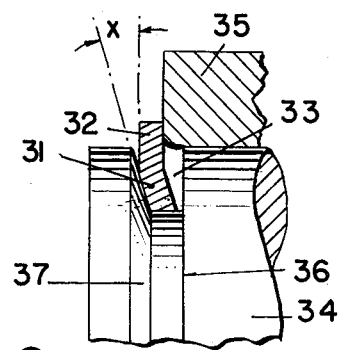
Figure 9:
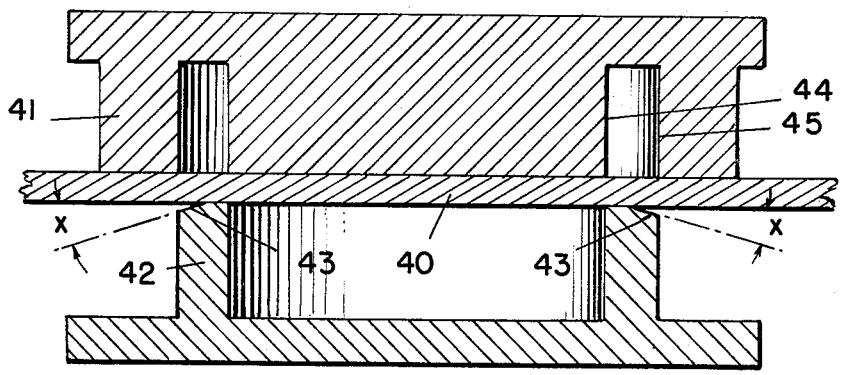
Figure 10:
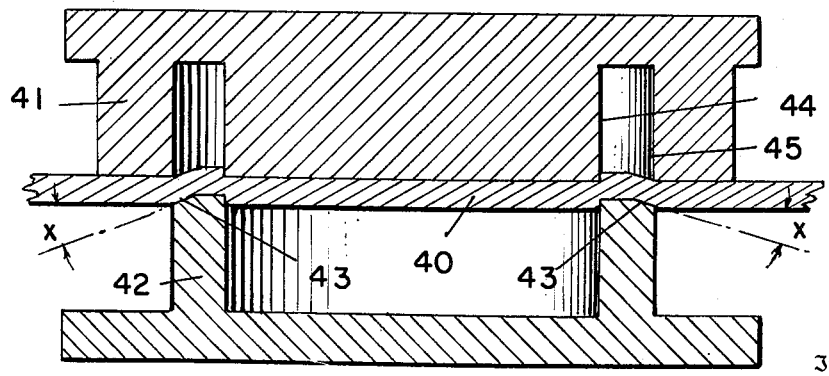

Figs. 7 and 8 are sections, respectively corresponding to Figs. 3 and 4, of a retaining ring assembly employing the external ring illustrated in Figs. 5 and 6; and Figs. 9 and 10 are sectional views of a punch and die mechanism for effecting the single step method of manufacturing retaining rings of the type herein contemplated.

Referring to Figs. 1-4 inclusive, numeral 10 designates an internal spring retaining ring which is preferably fashioned from sheet or strip stock and thus has rectangular section, the major dimension of which extends radially. The ring is adapted to be sprung into a groove provided therefor in a housing bore and protrudes therefrom to provide an artificial shoulder in the bore for securing a machine part against axial displacement within the housing. The illustrated ring is of open-ended and tapered construction; that is to say, its section height (radial width) progressively decreases from the ring middle section $a$ to the free ends $b$, $b'$ thereof. Preferably, the free ends are formed with inwardly projecting lugs or ears 11, 11' having apertures 12, 12' for receiving the points of a plier-like tool (not shown) by which the ring may be contracted and thereupon slipped into the housing bore and upon release sprung into its seating groove. It will be understood that, due to its taper, the ring maintains circularity when contracted, so that, when sprung into its groove and stressed against the groove bottom, its outer edge is adapted to engage with spring pressure against the groove bottom throughout its full arcuate length.

According to the invention, an annular zone 13 of the ring adjoining the outer or groove edge thereof is inclined, as by bending, to the plane of the inner body portion 14 of the ring, which latter is adapted to provide the shoulder against which the machine part to be located abuts. It will be observed from Fig. 1 that the annular inclined zone 13 of the ring extends the full arcuate length of the ring outer edge, and from Fig. 2 that it uniformly inclines to the plane of the ring body portion 14 by the angle $x$. Hence, with the annular zone 13 of the ring forming in effect a beveled seating or groove edge, the ring is adapted to take up axial end play in assemblies in which it is mounted, to the same extent as prior rings provided with a beveled surface adjacent its groove. At the same time, the present ring possesses greater strength and resistance to warping and distortion when deformed than the prior beveled rings because of the uniform axial thickness of its section.

The action of the improved ring in taking up end play will be apparent from an anlysis of Figs. 3 and 4, in which numeral 15 designates a housing having a bore 16 in which is disposed a shaft or other machine part 17 to be secured against axial displacement in the bore by the internal retaining ring 10, as described. The bore is provided with an internal ring seating groove 18 whose inner side wall 19 is overhung by the machine part 17. The opposite side wall 20 of the groove is inclined by an angle corresponding to the angle $x$ by which the beveled edge 13 (annular zone) of the retaining ring is inclined to the body or shoulder forming portion 14 thereof. In Fig. 3 the ring is shown to be sprung into its groove 18 but only partially seated therein, it being observed that the correspondingly inclined faces of the beveled edge portion of the ring and the outer side wall of the groove are in engagement. The inner or holding face of the ring is shown to be in face engagement with the end face of the shaft 17.

Due to the tendency of the ring to expand from its stressed (contracted) condition to its full seated position illustrated in Fig. 4, the ring acts as a wedge having a component of axial thrust which it exerts on the end face of the shaft 17, thereby to take up any end play existing between ring and shaft end. Thus, the ring, through its ability to tightly abut itself against the part to be held, is capable of taking up end play up to the total permissible tolerances likely to occur in a retaining ring assembly of the character under consideration and is thereby enabled to accurately locate the machine part 17 within the housing bore 16.

Referring to Figs. 5-8 inclusive, illustrating an external retaining ring according to the invention and a typical assembly in which it is employed, the external ring generally designated 30 is of tapered and open-ended construction whereby it deforms circularly when spread over a shaft end and seated against the bottom of a groove having diameter somewhat greater than that of the free diameter of the ring inner edge. Adjacent said inner edge and extending throughout the full arcuate length thereof, the ring has an annular zone 31 which is bent or otherwise inclined by the acute angle $x$ to the plane of the plane of the outer or shoulder forming body portion 32 thereof. Accordingly, the ring is provided along its inner or groove edge with a bevel corresponding to the bevel provided in known rings by a grinding operation, but differs from the known beveled rings in that the axial thickness of the ring is uniform throughout the full radial width thereof.

Referring to Fig. 7, illustrating a typical assembly employing the improved external retaining ring shown in Figs. 5 and 6, and wherein the ring is shown to be partially seated in a groove 33 provided in a shaft 34 on which is mounted the machine part 35 to be held, it will be observed that the inner side wall 36 of the groove is overhung by said machine part and that the outer side wall 37 of the groove is inclined by an angle $x$ corresponding to the angle of inclination of the beveled inner edge portion of the ring. With the ring partially seated as shown, its beveled edge portion 31 has wedging engagement with the inclined groove side wall 37. Due to the tendency of the ring to contract and seat itself against the groove bottom, as in Fig. 8, such engagement results in the ring through its axial thrust component maintaining tight engagement with the end face of the machine part. By proper selection of ring dimensions and the angle of inclination of its beveled edge portion, the ring is capable of taking up end play as results from the tolerances in the dimensions of the machine part, of the groove, and of the ring itself.

According to a further feature of the invention, by which beveled rings of the character disclosed are manufactured in a single-step process as distinguished from the two-stage process necessary to the manufacture of the prior beveled rings, reference is had to Figs. 9 and 10 illustrating more or less diagrammatically one means for carrying out the preferred process. In said views, a metal strip 40 from which the internal rings of the invention are to be fashioned is fed into a press consisting of complemental ring-shaped die and punch elements 41, 42. The punch element is provided along its outer cutting edge with a chamfer 43 inclined to the punch face proper by an angle $x$, such being the angle of inclination of the groove edge portion of the ring to its body portion. Upon first lowering of die 41, it will be seen (Fig. 10) that its inner edge 44 immediately cuts into the strip while its outer edge 45 first bends the material of the strip inwardly of said edge to the inclination of the chamfer 43, and thereafter cuts into and finally through said strip. Thus, in a single lowering stroke of the die, the ring is blanked out and its outer edge portion is inclined to its body portion, thereby to effect complete fabrication of the ring in a single-step process. The described single-step process is employed also in the manufacture of the external rings shown in Figs. 5 and 6, with the difference that the chamfer 43 is applied along the inner rather than the outer cutting edge of the punch element.

Without further analysis, it will be seen that the invention achieves the stated and other desirable and practical objects in the provision of a retaining ring having a bevel along its groove edge but which at the same time has uniform axial thickness throughout its full radial width. Accordingly, retaining rings as herein provided are free from the disadvantage of the prior retaining rings having a beveled surface along its groove edge imparted as by removing (grinding away) material from the section of the ring and which results in a reduction in the strength thereof. The invention moreover provides a simple single-step process of manufacturing beveled retaining rings of uniform section thickness, and thus the present rings can be manufactured much more simply and inexpensively than the prior rings of comparable function.

As many changes could be made in carrying out the above construction without departing from the scope of the invention, it is intended that all matter contained in the above description or shown in the accompanying drawing shall be interpreted as illustrative and not in a limiting sense.

We claim:

1. A retaining ring adapted to be sprung into the groove of a shaft, housing and the like and thereupon to form an artificial shoulder for securing a machine part against axial displacement relative thereto comprising an open-ended spring ring fashioned from strip or sheet stock and being or rectangular section with its major dimension disposed radially, said section having uniform axial width and radial height which progressively diminishes from the ring middle section to the free ends of the ring, whereby the ring maintains circularity under deformation, said ring having a radial shoulder-forming body portion and a groove seating edge portion which is inclined to the body portion by an acute angle, the free ends of the ring having ears projecting from said body portion which are apertured to receive the working points of a ring handling tool.

2. A retaining ring as set forth in claim 1, wherein the outer edge portion of the ring is inclined to the body portion thereof.

3. A retaining ring as set forth in claim 1, wherein the inner edge portion of the ring is inclined to the body portion thereof.

HEINRICH HEIMANN.
LAWRENCE BROZEK.

REFERENCES CITED

The following references are of record in the file of this patent:

UNITED STATES PATENTS

| Number | Name | Date |
| --- | --- | --- |
| 955,160 | Holmes | Apr. 19, 1910 |
| 1,752,982 | Herold | Apr. 1, 1930 |
| 2,133,445 | Guerin | Oct. 18, 1938 |
| 2,379,053 | Weingart | June 26, 1945 |
| 2,382,947 | Brozek | Aug. 14, 1945 |
| 2,413,591 | Sturdy | Dec. 31, 1946 |
| 2,416,852 | Schaaff et al. | Mar. 4, 1947 |

FOREIGN PATENTS

| Number | Country | Date |
| --- | --- | --- |
| 233,427 | Switzerland | July 31, 1944 |